Figure 1:
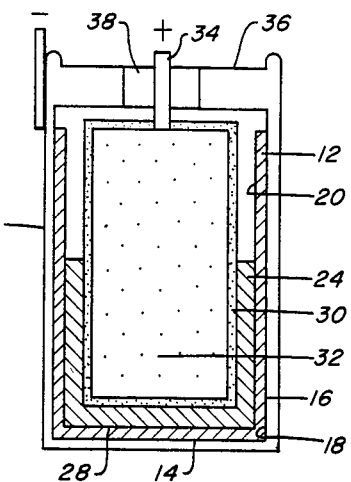

United States Patent [19]

Kane et al.

[11] Patent Number: 4,563,401
[45] Date of Patent: Jan. 7, 1986

[54] ELECTROCHEMICAL CELL WITH ADJUSTABLE STEP-LIKE OUTPUT VOLTAGE

[75] Inventors: Philip F. Kane, East Weymouth; Nikola Marincic, Winchester, both of Mass.

[73] Assignee: Battery Engineering, Inc., Hyde Park, Mass.

[21] Appl. No.: 686,614

[22] Filed: Dec. 24, 1984

Related U.S. Application Data

[63] Continuation of Ser. No. 521,184, Aug. 8, 1983, abandoned.

[51] Int. Cl.⁴ .................................................. H01M 10/48
[52] U.S. Cl. ..................................... 429/91; 429/105; 429/196; 429/199
[58] Field of Search .............. 429/101, 105, 91, 196, 429/210, 1, 128, 199

[56] References Cited

U.S. PATENT DOCUMENTS 4,293,622 10/1981 Marincic et al. ................. 429/91 X
4,331,745 5/1982 Catanzarite ..................... 429/105 X
4,416,957 11/1983 Goebel et al. ................... 429/101 X
4,431,719 2/1984 Uiry ..................................... 429/105

*Primary Examiner*—Charles F. LeFevour
*Attorney, Agent, or Firm*—Pahl, Lorusso & Loud

[57] ABSTRACT

An electrochemical cell of the type characterized by an essentially constant operating voltage essentially independent of the degree of cell discharge is disclosed, which in its output voltage exhibits one or more step changes of predetermined and fully adjustable magnitudes at any predetermined point or points during the life of the cell. This enables timely replacement of the cell under non-critical circumstances, and also can be used to indicate state of discharge of the cell. In essence, the anode of the cell comprises a plurality of anode elements which become depleted at mutually different degrees of cell discharge. As each anode element becomes depleted, the internal resistance of the cell increases to cause a drop in the operating voltage of the cell as the remaining active anode elements are required to supply the required current.

12 Claims, 3 Drawing Figures

4,563,401

ELECTROCHEMICAL CELL WITH ADJUSTABLE STEP-LIKE OUTPUT VOLTAGE

This application is a continuation of Ser. No. 521,184 filed on Aug. 8, 1983 now abandoned.

BACKGROUND OF THE INVENTION

The present invention relates to electrochemical cells and, more particularly, to cells characterized by an operating voltage which is essentially independent of the degree of cell discharge. These cells typically employ alkali metals as the anode, an electrolyte which employs an oxyhalide depolarizer together with a Lewis acid and Lewis base solute, and a cathode structure formed from a finely ground non-metallic powder such as carbon graphite capable of functioning as a catalyst for oxyhalide reduction.

The alkali metal anode material may, for example, be lithium, sodium, potassium, or calcium. The oxyhalide depolarizer may be thionyl chloride, sulfuryl chloride, or phosphoroxy chloride. A typical Lewis acid and base pair are aluminum chloride and lithium chloride. Of course, other materials may be substituted.

Although the essentially stable operating voltage of such cells has greatly simplified the design of electrical devices by eliminating the need to compensate for changes in cell voltage, this same characteristic has been a matter of concern for designers of certain devices—notably pacemakers, infusion pumps, and other surgically implanted devices. Naturally the reason for concern is the inability to discern the state of discharge of the cell and, subsequently, to predict end-of-life. Due to their unsurpassed energy, power densities and high current capabilities, these cells are otherwise more desirable than other types of cells.

The need has become apparent, therefore, for a cell having the energy and power densities and current capabilities of the aforedescribed cells but which also provides an indication of state of discharge or proximity to completion of cell life. In that different applications of said cell could require indications of varying orders of magnitude occurring at varying states of discharge of the cell it would therefore, be most desirable to have an indicating signal of adjustable magnitude which could be made to appear at any predetermined point or points during the discharge of the cell. Broadly, the invention herein embodies a solution to this particular problem.

DESCRIPTION OF PRIOR ART

U.S. Pat. No. 4,293,622, describes a cell which exhibits a step change in its operating voltage sufficiently prior to complete cell discharge to enable timely replacement of the cell. The manifestation of the step is a product of the stoichiometry of the cell.

In "A Depletion Sensor for Lithium Cells" presented at the Florida Atlantic University Lithium Battery Technology and Application Seminar and Workshop, Mar. 9-11, 1983, De Haan described a method of monitoring end-of-life within the lithium liquid depolarized cell whereby a third electrode is utilized to monitor discharge depth of the lithium anode. Employing a third electrode, however, necessitates the use of additional hardware and complicates the manufacturing process of the cell. It is also impractical to employ more than one such indicator in each electrochemical cell due to this same complexity of nature. This system also allows some margin of error, at least theoretically, in that its indicator is an actual wire, thus occupying some finite volume.

SUMMARY OF THE INVENTION

The cell described herein offers an operating voltage which is essentially independent of the degree of cell discharge except for a desired number of step changes. Each of the step changes is, by cell design, of a desired magnitude and occurs at a preselected degree of cell discharge.

In essence the electrochemical cell herein comprises anode-functioning means, cathode-functioning means and electrolyte-functioning means formed of respective materials which provide an electrochemical system characterized by an operating voltage essentially independent of the degree of cell discharge. The anode-functioning means includes a plurality of electrochemically active surface members arranged to become non-active at mutually different degrees of system discharge. As each surface member becomes non-active, the remaining surface members must support the current capability of the cell depleted, increasing internal cell resistance and consequently reducing the cell's operating voltage.

Further details will be appreciated by referring to the Description of the Preferred Embodiment herein below, of which the following drawing is a part.

Figure 2:
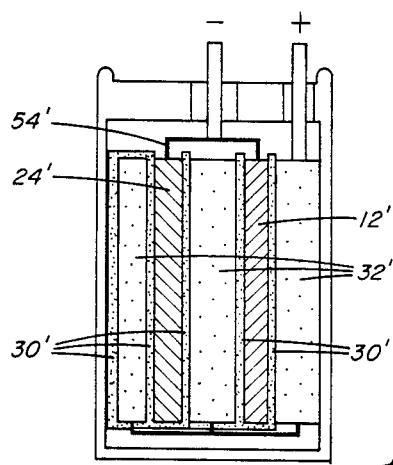
Figure 3:
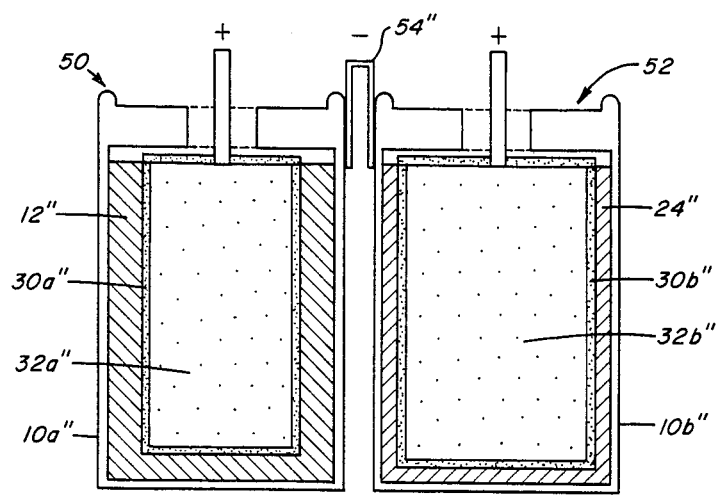

In the drawing, FIGS. 1-3 is a sectional view in schematic of a preferred cell configuration constructed in accordance with the invention, and FIGS. 2-3 are sectional views in schematic of alternative embodiments of an electrochemical cell constructed in accordance with the invention.

Referring initially to FIG. 1, an electrochemical cell constructed in accordance with the invention is schematically illustrated in section within a housing 10. The cell includes a first means functioning as an anode in the form of a cylindrical member 12 preferably formed from lithium foil. The member 12 comprises an endwall 14, an exterior surface 16 contacting the interior sidewall 18 of the container and an interior surface 20 which will be electrochemically active during cell operation. Those skilled in the art recognize that the lithium anode will be consumed during cell operation, causing the interior portions of the foil to be eventually exposed as the surface 20. Accordingly, the thickness of the foil will decrease during cell operation.

A second cylindrical anode-functioning structure 24, also preferably formed from lithium foil, is radially sized to fit within the internal diameter of the anode 12 and is axially sized to co-extend along only a portion of the axial length of anode 12 when the respective endwalls 26, 28 of the anodes 12, 24 are contiguous. Owing to the cold-welding property of lithium, with which skilled artesians are familiar, the first and second anodes 12, 24 become bonded together by the outward radial pressing of the anode 24 against the sidewall 20 of the first anode 12 and the axial pressing of the endwalls 26, 28 together.

As shown in FIG. 1, the anode structure thus formed by the two anode-functioning members 12, 24 has a greater thickness where the members 12, 24 are co-extensive, and a lesser thickness where they are not.

Once the afore-described members have been inserted, a hollow cylindrically-shaped porous paper separator 30, having an endwall 31, is inserted within the internal diameter of the anode structure to minimally physically separate the anode structure from the cathode, hereinafter described, while permitting electrolyte to couple the two.

Following the insertion and placement of the separator 30, a solid cylindrical cathode, preferably of carbon graphite, is inserted into the internal diameter of the separator. The cathode 32 is electrically coupled to a terminal 34 which extends through a cover 36 sealed onto the container 10. The container 10 may be formed from electrically conductive material whereby the contact of the container with anode surface 16 will permit use of the container as the anode terminal. Where the container is functioning as the anode terminal, a glass-to-metal seal 38 known in the art can conveniently be used to insulate the cathode terminal 34 from the container 10.

In operation, the discharge rate over the entire surface of the anode material is the same. Accordingly, the thinner portion of the anode structure will become depleted first. The resultant lesser surface area of anode material must support an overall current of the same magnitude. Since the total amount of anode surface area has been depleted, so has the current capability of the partially discharged cell, hence increasing the internal resistance of the cell. The consequential reduced output voltage level is a function of the discharge rate of the cell, and the amount of anode surface area remaining. It is, thus, controllable by adjusting the ratio of the surface area of the thinner anode layer to that of the thicker anode layer. By adjusting the actual layer thicknesses (i.e., of anodes members 12, 24) the point or points at which the step change is manifested can be adjusted.

FIGS. 2 and 3 schematically illustrate, in section, alternative embodiments of electrochemical cells constructed in accordance with the invention. For simplicity, elements in FIGS. 2 and 3 which are similar to elements in FIG. 1 have been identified with similar numerals.

In FIG. 2, two anode structures 12', 24' having different thicknesses have been electrically coupled in parallel by means 54'. The interior walls of the container 10 are lined with separator material 30'. Cathode material 32' is placed around the anodes and minimally separated therefrom by separators 30'. As in the cell of FIG. 1, the cell of FIG. 2 will experience a step-like change in its internal resistance when the thinner anode 12' becomes depleted and the subsequent current drain is born by anode 24'.

In FIG. 3, a pair of cells are shown electrically coupled in parallel to form a "cell" in accordance with the invention. One cell 50 includes a thick anode 12'', while the second cell 52 contains a relatively thinner anode 24''. The anodes 12'', 24'', are electrically coupled in parallel through the respective cell containers 10a'', 10b'', by coupling means 54'.

There are numerous variations and modifications within the spirit of the invention which will be obvious to those skilled in the art having the benefit of these teachings and the aforedescribed embodiments. For example, the specific shapes and cell configurations can be changed. Cells exhibiting a plurality of step changes during cell discharge can be fabricated. It is accordingly intended that the invention be defined solely by the appended claims and that the scope and interpretation of the claims be limited only by the prior art.

We claim:

1. An electrochemical cell, comprising:
   alkali anode means comprising at least two surface members of the same electrochemically active material and of different thicknesses, each member having a surface area exposed to the interior of said cell;
   oxyhalide cathode means comprising one or more surface members having surface areas coextensive with said exposed surface areas of said anode means;
   electrolyte means disposed between said coextensive surface areas of said anode means and said cathode means;
   said anode means, cathode means and electrolyte means being formed of respective materials adapted to provide a substantially constant output voltage until depletion of one of said anode members; and
   said one anode surface member of lesser thickness and not coextensive being depleted prior to said other anode surface member of greater thickness and coextensive to produce a step change in said output voltage from a higher substantially constant output voltage to a lower substantially constant output voltage.

2. An electrochemical cell in accordance with claim 1, wherein:
   said anode means comprises a hollow cylindrical structure including a first annular member of lesser thickness and a second annular member of greater thickness integral with said first annular member; and
   said cathode means comprises a solid cylindrical member inserted into said hollow cylindrical anode structure and having an outer surface area coextensive with said inner surface area of said first and second annular members.

3. An electrochemical cell in accordance with claim 2 wherein the anode means comprises at least two anode layers which are bonded together.

4. An electrochemical cell in accordance with claim 1 wherein the thicknesses of the anode surface members have a ratio corresponding to the magnitude of a desired step change in operating voltage.

5. An electrochemical cell in accordance with claim 1 wherein the anode surface members are formed from an electrochemically active alkali metal selected from the group consisting of lithium, sodium, potassium, and calcium.

6. An electrochemical cell in accordance with claim 5 wherein the electrolyte means includes an oxyhalide depolarizer together with a Lewis acid and Lewis base solute.

7. An electrochemical cell in accordance with claim 6 wherein the oxyhalide depolarizer is selected from the group consisting of thionyl chloride, sulfuryl chloride and phosphoroxy chloride.

8. An electrochemical cell in accordance with claim 6 wherein the Lewis base acid is aluminum chloride and the Lewis base is lithium chloride.

9. An electrochemical cell in accordance with claim 1 wherein the cathode means includes a finely ground non-metallic powder capable of functioning as a catalyst for oxyhalide reduction.

10. An electrochemical cell in accordance with claim 1 wherein the anode means comprises a continuous structure.

11. An electrochemical cell in accordance with claim 1 wherein the anode means comprises at least two anodes which are physically separated and coupled in parallel by electrically-connective means.

12. An electrochemical cell in accordance with claim 1 wherein the anode means comprises at least two anodes contained within individual electrochemical cell containers and coupled in parallel by electrically-connective means through their respective cell containers.

* * * * *